July 2, 1940.     E. E. HUESBY     2,206,322

DIESEL ENGINE COMBUSTION CHAMBER

Filed Sept. 8, 1938

Inventor
ELMER E. HUESBY
Attorney.

Patented July 2, 1940

2,206,322

UNITED STATES PATENT OFFICE 2,206,322

DIESEL ENGINE COMBUSTION CHAMBER

Elmer E. Huesby, Los Angeles, Calif.

Application September 8, 1938, Serial No. 228,907

3 Claims. (Cl. 123—32)

The present invention relates to improvements in Diesel engines and more particularly resides in the provision of a new and improved combustion chamber construction which will make possible a more thorough combustion, afford a better control of combustion, effect a worthy economy in fuel consumption and generally increase the efficiency of such an engine.

One of the objects of the invention is to provide improvements, of the character described which may be advantageously embodied in the cylinder head and in a boss or projection on the piston, and includes an air cell or compression chamber separated by an apertured partition from an ante or initial combustion chamber, into which latter fuel is injected while jets of compressed air are forcibly discharged from the compression chamber thru the apertures in said partition by means of the piston action of said apertured boss or projection in the compression chamber, the apertures of the boss registering with the apertures of the partition, whereby to communicate the two chambers as aforesaid.

The invention further contemplates the provision of a combustion chamber construction of the character described, by means of which an effective dual turbulence and a thorough and controlled combustion are provided, due to the elongation and particular design of the initial combustion chamber and the manner in which passages formed in the piston boss and partition between the chambers, extend from the air compression chamber and communicate with said combustion chamber substantially tangentially of and adjacent opposite ends of the latter, and also due to the manner in which fuel is injected between the dual "cyclones" of air, from a point between the ends of said combustion chamber, in accordance with this invention.

Another object of the invention is to provide an engine construction of the character described, wherein the piston carried boss or projection is provided with a small chamber extending axially thereof, from which apertures or passages extend radially outward and are adapted to register with the apertures of the partition, this construction providing for a comparatively long compression stroke of the boss in the compression chamber and a relatively high degree of compression of the air therein, whereby to forcibly inject compressed air into the combustion chamber, as aforesaid.

I have shown a preferred form of a Diesel engine combustion chamber in the accompanying drawing, embodying my invention, subject however, to modification within the scope of the appended claims, without departing from the spirit of my invention.

Referring to the drawing.

Figure 1:
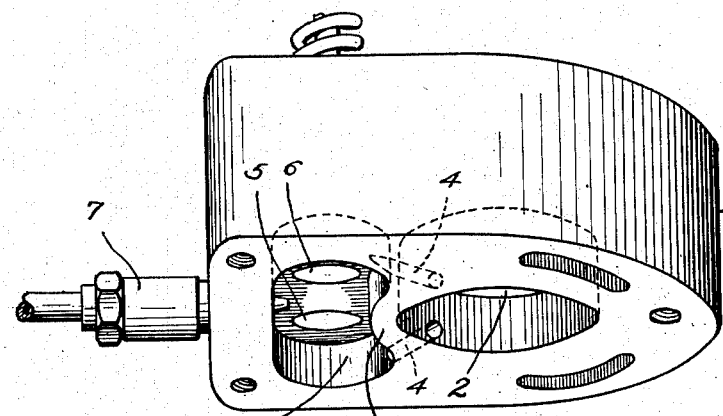
Fig. 1 represents a perspective view of a combustion head made in accordance with this invention.
Figure 2:
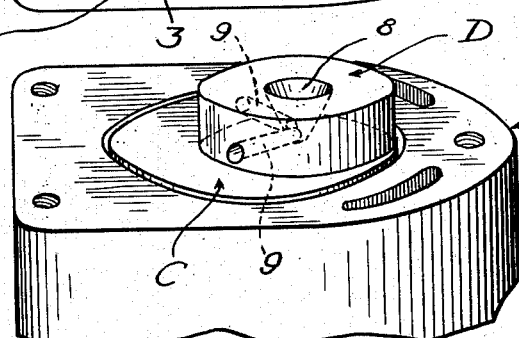
Fig. 2 represents a fragmentary perspective view of a cylinder of a Diesel engine with the head removed and showing the piston carried boss or projection.

In the form of the invention here shown, I provide a cylinder head A adapted to be affixed in the usual manner upon a cylinder B as of a Diesel engine, in which cylinder is mounted the usual piston C having an eccentrically disposed boss or a projection D on its upper end, either formed integral therewith or otherwise attached thereto.

In accordance with this invention the head A is provided with an elongated ante or initial combustion chamber 1, and a cylindrical air compression chamber 2 separated from the chamber 1 by a partition or wall 3, there being apertures or passages 4 therein for communicating the chamber 2 with the chamber 1. It is noted that the passages 4 communicate with the combustion chamber 1 so as to discharge jets of air tangentially of and adjacent the rounded ends of the chamber whereby to provide dual turbulence or cyclones of air, as indicated by the arrows shown in Fig. 4.

Communicating with the upper side of the chamber 1 are the usual intake and exhaust ports controlled by the valves 5 and 6. A fuel injector 7 connected with a suitable source of supply of fuel under pressure, not shown, is mounted on the head A so as to inject fuel at a point between the two cyclones of air.

The boss or projection D is adapted to extend upwardly into the compression chamber 2 for the purpose of compressing air therein, whereby to force the air through the passages 4 into the combustion chamber 1. To effectively accomplish this and to secure a high degree of compression, the boss D is arranged to have a comparatively long stroke in the chamber 2 and is provided centrally and axially with a somewhat conical recess or chamber 8, from the inner end of which passages 9 extend laterally to the periphery of said boss. The outer ends of the passages 9 will register with the passages 4 when the boss D is fully extended into the chamber 2 substantially as shown in Fig. 3, Fig. 4 showing the manner of registration of the passages 9 and 4.

Figure 3:
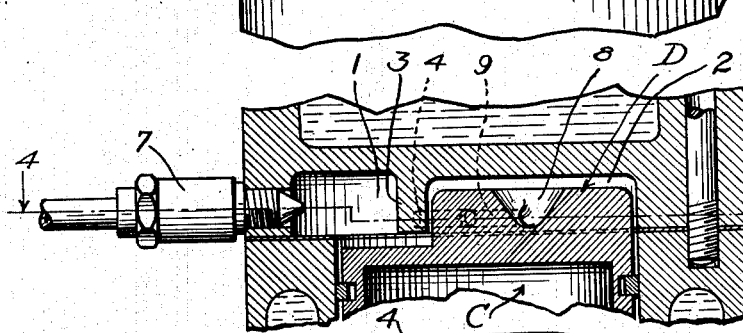
Fig. 3 represents a fragmentary vertical sectional view showing the head mounted upon the cylinder and the parts in position for creating the dual turbulence of the air in the combustion chamber substantially coincident with the time of injection of fuel.
Figure 4:
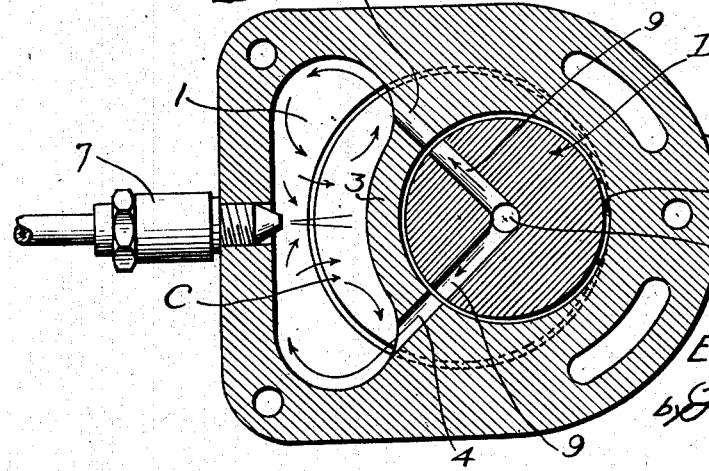
Fig. 4 represents a cross sectional view taken on the plane of line 4—4 of Fig. 3.

As particularly shown in Figs. 3 and 4 the chambers 1 and 2 register with the cylinder B in which the combustion chamber proper is provided and it is seen that when the piston C completes its air compressing stroke substantially at the time of injection of fuel as is customary in Diesel engines of this type, air in the chamber 2 will be compressed by the piston action of the boss D and said compressed air will pass through the recess or chamber 8 and passages 9 and 4 into the ends of the combustion chamber. The jets of air are discharged tangentially against the curved walls at the ends of the chamber 1 whereupon to create a dual turbulence action while the fuel injector 7 directs the fuel between the two air cyclones thus formed, as particularly shown in Fig. 4, for the purpose of securing an intimate admixture of the air and fuel and providing a thorough and controlled combustion, whereupon to increase the efficiency of the engine.

I claim:

1. In a Diesel engine, a cylinder, a cylinder head, said head having an elongated combustion chamber therein in part registering with the bore of the cylinder and provided with rounded ends, said head having an air compression chamber adjacent said combustion chamber and in full registration with the bore of said cylinder, and an arcuate partition separating said chambers in said head and having passages communicating at certain ends with said compression chamber, said passages opening tangentially of and into the rounded ends of said combustion chamber for creating dual turbulence of air injected into said chamber.

2. In a Diesel engine, a cylinder, a cylinder head, said head having an elongated combustion chamber therein in part registering with the bore of the cylinder and having rounded ends, said head having an air compression chamber adjacent said combustion chamber and in full registration with the bore of said cylinder, and an arcuate partition separating said chambers in said head and having passages communicating with said compression chamber, of said passages opening tangentially of and into the rounded ends of said combustion chamber for creating dual turbulence of air injected into said chamber, and means for injecting fuel at a point between the ends of the combustion chamber.

3. In a Diesel engine, a cylinder, a cylinder head, said head having an elongated combustion chamber therein in part registering with the bore of the cylinder and having somewhat enlarged and rounded ends, said head having an air compression chamber adjacent said combustion chamber and in full registration with the bore of said cylinder, and an arcuate partition separating said chambers in said head and having passages communicating with said compression chamber, said passages opening tangentially into said rounded ends of said combustion chamber for creating dual turbulence of air injected into said chamber, and means for injecting fuel at a point between the ends of the combustion chamber, a piston in said cylinder, and an apertured projection carried by said piston and adapted to extend into said compression chamber so that the apertures therein will register with said passages.

ELMER E. HUESBY.